United States Patent
Schwindeman et al.

(10) Patent No.: US 6,184,338 B1
(45) Date of Patent: Feb. 6, 2001

(54) ANIONIC POLYMERIZATION INITIATORS CONTAINING TERTIARY AMINE FUNCTIONALITY, THEIR CHAIN EXTENDED ANALOGUES, AND PROCESSES FOR USING THE SAME

(75) Inventors: James A. Schwindeman, Lincolnton; Robert J. Letchford, Cherryville, both of NC (US)

(73) Assignee: FMC Corporation, Philadelphia, PA (US)

( * ) Notice: Under 35 U.S.C. 154(b), the term of this patent shall be extended for 0 days.

(21) Appl. No.: 09/139,222

(22) Filed: Aug. 24, 1998

Related U.S. Application Data

(60) Provisional application No. 60/057,583, filed on Aug. 27, 1997.

(51) Int. Cl.$^7$ .......................... C08G 12/00; C08F 293/00; C08F 4/00; C08F 8/00
(52) U.S. Cl. .......................... 528/392; 528/423; 526/173; 526/180; 526/335; 526/336; 525/280; 525/332.8; 525/332.9; 525/333.1; 525/333.2; 525/366; 502/131; 502/157; 502/167
(58) Field of Search ...................................... 528/392, 423; 502/131, 157, 167; 526/173, 180, 335, 336; 525/280, 332.8, 332.9, 333.1, 333.2, 366

(56) References Cited

U.S. PATENT DOCUMENTS

| | | |
|---|---|---|
| 5,332,810 | 7/1994 | Lawson et al. ...................... 540/450 |
| 5,491,230 | 2/1996 | Lawson et al. ...................... 540/450 |
| 5,496,940 | 3/1996 | Lawson et al. ...................... 540/450 |
| 5,502,130 | 3/1996 | Lawson et al. ...................... 526/180 |
| 5,523,364 | 6/1996 | Engel et al. ...................... 526/180 |
| 5,527,753 | 6/1996 | Engel et al. ...................... 502/155 |
| 5,550,203 | 8/1996 | Engel et al. ...................... 526/336 |
| 5,565,526 * | 10/1996 | Schwindeman et al. ............ 525/272 |
| 5,567,774 * | 10/1996 | Schwindeman et al. ............ 525/288 |
| 5,574,109 | 11/1996 | Lawson et al. ...................... 528/229 |
| 5,605,872 | 2/1997 | Engel et al. ...................... 526/335 |
| 5,621,149 * | 4/1997 | Schwindeman et al. ............ 526/173 |
| 5,654,371 * | 8/1997 | Schwindeman et al. ............ 525/292 |
| 5,736,617 | 4/1998 | Kerns et al. ...................... 525/354.2 |
| 5,786,441 | 7/1998 | Lawson et al. . | |

FOREIGN PATENT DOCUMENTS

| | | |
|---|---|---|
| 0 850 941 A2 | 7/1998 | (EP) . |
| 0 850 942 A1 | 7/1998 | (EP) . |

* cited by examiner

Primary Examiner—P. Hampton-Hightower
(74) Attorney, Agent, or Firm—Alston & Bird LLP

(57) ABSTRACT

The present invention provides novel anionic polymerization amine initiators having a tertiary amine group pendant to the polymer chain and processes for making the same. The initiators can be useful in the preparation of tertiary amine containing polymers, including linear, homotelechelic, heterotelechelic and radial polymers.

32 Claims, No Drawings

ANIONIC POLYMERIZATION INITIATORS CONTAINING TERTIARY AMINE FUNCTIONALITY, THEIR CHAIN EXTENDED ANALOGUES, AND PROCESSES FOR USING THE SAME

CROSS-REFERENCE TO RELATED APPLICATIONS

This application is related to copending provisional Application Ser. No. 60/057,583, filed Aug. 27, 1997, the entire disclosure of which is hereby incorporated by reference, and claims the benefit of its filing date under 35 USC 119(e).

FIELD OF THE INVENTION

This invention concerns novel anionic polymerization initiators which contain tertiary amine functionality, their chain extended analogues, processes for preparing these initiators, polymers containing tertiary amine functionality, and processes for preparing these polymers.

BACKGROUND OF THE INVENTION

Monofunctional anionic initiators possessing amine functionalities are useful in preparing amino-terminated styrene-butadiene rubbers (SBR). See, for example, European Patent Application 593049A1 and U.S. Pat. No. 5,496,940 to Bridgestone Corporation. These elastomers have been shown to possess increased rebound, decreased rolling resistance, and lower heat build-up (reduced hysteresis). They are useful in forming improved, energy efficient tires, power belts, and mechanical goods.

Typically, the tertiary amino functionality is connected to the alkali metal via a connecting group. Exemplary tertiary amino initiators are illustrated, for example, in FIG. 1 below. Thus, the tertiary amine functionality of the resultant polymer is attached directly on the polymer backbone.

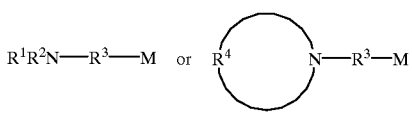

Figure 1 wherein:

M is an alkali metal, preferably lithium;

$R^1$ and $R^2$ are alkyl, cycloalkyl or aralkyl having from 1 to 12 carbon atoms;

$R^3$ is a linear-, branched-, or cyclo-alkylene having from 2 to 20 carbon; and $R^4$ is a divalent alkylene, oxy- or amino-alkylene, or substituted alkylene having 6 to 20 carbon atoms. See U.S. Pat. Nos. 5,332,810 and 5,496,940.

Recently, a method of incorporating tertiary amine functionality was described in U.S. Pat. No. 5,736,617, to Bridgestone Corporation. This patent is directed to use of an electrophile, described generically in FIG. 2, to quench a living polymer anion.

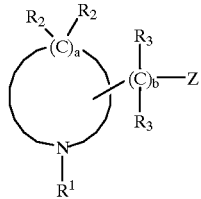

Figure 2 wherein:

Z is a halogen atom;

$R^1$ is selected from the group consisting of organic groups containing from 1 to about 12 carbon atoms and a bridging bond;

each $R^2$ is independently selected from the group consisting of hydrogen, organic groups containing from 1 to about 12 carbon atoms and a bridging bond;

each $R^3$ is independently selected from the group consisting of hydrogen, organic groups containing from 1 to about 12 carbon atoms;

a is an integer from 4 to about 16; and b is an integer from 0 to about 12. These materials, however, were not very efficient electrophiles, as relatively low incorporation of tertiary amine functionality was obtained (11–73%).

SUMMARY OF THE INVENTION

The present invention provides tertiary amino anionic polymerization initiators of the formula:

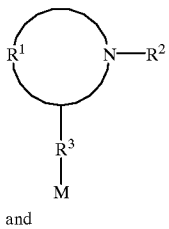

and

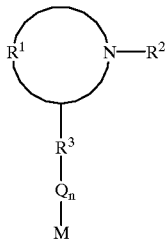

wherein:

M is an alkali metal;

$R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

$R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl;

saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;

$R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—$R^3$ linkage; and n is an integer from 1 to 5.

The present invention also provides processes for making the tertiary amino initiators of the invention. In this aspect of the invention, the tertiary amino initiators of this invention are prepared by reaction of selected tertiary amino halides with an alkali metal at a temperature ranging from about 35 to 130° C. in a hydrocarbon solvent to form an alkylorganometallic compound containing a tertiary amine. The resultant compound can be further reacted with one or more conjugated dienes or one or more alkenylsubstituted aromatic compounds, or a mixture thereof, to form an extended hydrocarbon chain between M and $R^3$ (designated as $Q_n$ above). Such compounds can have increased solubility in hydrocarbon solvents.

In another aspect of the invention, the tertiary amino initiators of the invention are used to initiate and polymerize anionically polymerizable monomers (such as one or more conjugated dienes, one or more alkenylsubstituted aromatic compounds, or mixtures thereof) to form a living polymer having a pendant tertiary amine functionality. The living tertiary amine containing polymers can be further reacted with a suitable terminating, end capping or coupling agent as known in the art to form linear homotelechelic or heterotelechelic polymers and/or radial polymers. The resultant polymers can further be optionally hydrogenated.

The present invention also provides novel polymers, in which, in contrast to the polymers of the prior art, the tertiary amine functionality is pendant to the polymer backbone. High tertiary amino functionality can be achieved because each polymer chain has a contains an amino functionality derived from the initiator. Further, the tertiary amino funtionalized polymers have improved utility as materials with reduced hysteresis. In addition, the molecular architecture of compounds of the present invention can be precisely controlled. The degree of functionality can be adjusted by simply varying the ratio of tertiary amino functional initiator to coupling agent. Further, the monomer identity, the monomer composition and molecular weight can be independently manipulated by varying the monomer charged. Finally, the number of polymer arms can be adjusted by varying the nature of the coupling agent, and the ratio of living polymer to the coupling agent.

DETAILED DESCRIPTION OF THE INVENTION

The novel, tertiary amino anionic polymerization initiators of the invention can be described as illustrated in FIG. 3 below.

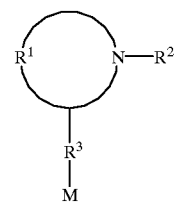

Figure 3 wherein:

M is an alkali metal;

$R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

$R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl; and $R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms.

As used herein, the term "lower alkyl" refers to straight chain or branched, saturated or unsaturated, C1–C10 alkyl. The term "aryl" refers to C5–C25 aryl having one or more aromatic rings, each of 5 or 6 carbon atoms. Multiple aryl rings may be fused, as in naphthyl or unfused, as in biphenyl. The term "substituted aryl" refers to C5–C25 aryl substituted with one or more lower C1–C10 alkyl. Exemplary aryl and substituted aryl groups include, for example, phenyl, benzyl, and the like.

The tertiary amino initiators of this invention are prepared by reaction of selected tertiary amino halides, such as described in FIG. 4, with an alkali metal selected from lithium, sodium and potassium, for example at a temperature ranging from about 35 to 130° C., advantageously at an elevated temperature (>40° C.), in a hydrocarbon solvent containing five to ten carbon atoms and mixtures of such solvents to form an alkylorganometallic compound containing a tertiary amine.

Figure 4

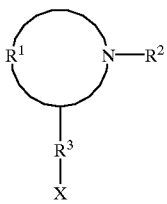

wherein:

X is halogen selected from the group consisting of chlorine, bromine and iodine; and $R^1$, $R^2$, and $R^3$ are as defined above. These halides are commercially available or can be prepared using techniques known in the art.

Examples of tertiary amino halides useful in the practicing this invention include, but are not limited to, 2-(2-chloroethyl)-N-methylpiperidine, 2-(2-chloroethyl)-N-ethylpiperidine, 2-(2-chloroethyl)-N-propylpiperidine, 2-(2-chloroethyl)-N-methylpyrrolidine, 2-(2-chloroethyl)-N-ethylpyrrolidine, 3-(chloromethyl)-N-methylpiperidine, 3-(chloromethyl)-N-ethylpiperidine, 4-(2-chloroethyl)-N-methylpiperidine, 4-(2-chloroethyl)-N-ethylpiperidine, 4-(2-chloroethyl)-N-propylpiperidine, 4-(chloromethyl)-N-methylpiperidine, 4-(chloromethyl)-N-ethylpiperidine, 4-(chloromethyl)-N-propylpiperidine, 2-(2-chloroethyl)-N-methylhexamethyleneimine, 2-(2-chloroethyl)-N-methylmorpholine, and mixtures thereof.

The novel, tertiary amino chain extended polymerization initiators of the invention include compounds as shown in FIG. 5 below.

Figure 5

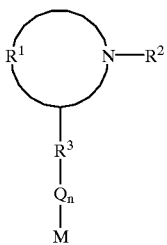

wherein:

M is an alkali metal;

$R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

$R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;

$R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—$R^3$ linkage; and n is an integer from 1 to 5.

These chain extended compounds can have greater solubility in hydrocarbon solution than the compounds described in FIG. 3. For example, the solubility of 2-(2-lithioethyl)-N-methyl-piperidine in cyclohexane solution was about 6 weight percent. However, when this same material was chain extended with two equivalents of isoprene, the solubility increased to over 28 weight percent. Similar increases in solubility were observed for other chain extended analogues.

The initiators described in FIG. 5 are prepared by reacting an organometallic compound of the formula described in FIG. 3 wherein M, $R^1$, $R^2$, and $R^3$ have the meanings ascribed above, with one or more conjugated diene hydrocarbons, one or more alkenylsubstituted aromatic compounds, or mixtures of one or more dienes with one or more alkenylsubstituted aromatic compounds, to form an extended hydrocarbon chain between M and $R^3$ in FIG. 5, which extended chain is denoted as $Q_n$ in FIG. 5. The compounds of FIG. 5 are prepared by first reacting in an inert solvent a selected tertiary amino halide (FIG. 4) with an alkali metal at a temperature ranging from about 35° C. to about 130° C., advantageously at a temperature above about 40° C., to afford an organometallic compound of FIG. 3, which is then optionally reacted with a one or more conjugated diene hydrocarbons, one or more alkenylsubstituted aromatic compounds, or mixtures of one or more dienes with one or more alkenylsubstituted aromatic compounds, in a predominantly alkane, cycloalkane, or aromatic reaction solvent, which solvent contains 5 to 10 carbon atoms, and mixtures of such solvents to produce an initiator with an extended chain or tether between the metal atom (M) and $R^3$ in FIG. 5 above and mixtures thereof with compounds of FIG. 3.

Incorporation of Q groups into the M—$R^3$ linkage to form the compounds of FIG. 5 above involves addition of compounds of FIG. 3 across the carbon to carbon double bonds in compounds selected from the consisting of one or more conjugated diene hydrocarbons, one or more alkenylsubstituted aromatic compounds, or mixtures of one or more dienes with one or more alkenylsubstituted aromatic compounds to produce new carbon-lithium bonds of an allylic or benzylic nature, similar to those found in a propagating polyalkadiene or polyarylethylene polymer chain derived by anionic initiation of the polymerization of conjugated dienes or arylethylenes. These new carbon-lithium bonds are now "activated" toward polymerization and so are much more efficient in promoting polymerization than the precursor M—$R^3$ (M=Li) bonds themselves.

Exemplary conjugated dienes for producing the chain extended initiator include without limitation 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and the like and mixtures thereof.

Exemplary alkenylsubstituted aromatic compounds for producing the chain extended initiator include without limitation styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methylhexene-1 and the like and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include without limitation 3-methylstyrene, 3,5-diethylstyrene, 4-(tert-butyl)-styrene, 2-ethyl-4-benzylstyrene, 4-phenylstyrene, 4-p-tolylstyrene, 2,4-divinyltoluene, 4,5-dimethyl-1-vinylnaphthalene, and the like and mixtures thereof. Reference is made to U.S. Pat. No. 3,377,404 for disclosures of additional vinyl-substituted aromatic compounds. Non-polymerizable alkenyl substituted aromatic compounds such as 1,1-diphenylethylene may also be used.

The alkali metal used in preparing the organometallic compounds containing tertiary amines, selected from lithium, sodium and potassium, is used as a dispersion whose particle size usually does not exceed about 300 microns. Preferably the particle size is between 10 and 300 microns although coarser particle size alkali metal can be used. When lithium metal is employed, the lithium metal can contain 0.2 to 1.0 and preferably 0.8 weight percent sodium. The alkali metal is used in amounts of 90% of theoretical to a 400% excess above the theoretical amount necessary to produce the compounds. The reaction temperature is greater than about 40° C. up to just below the decomposition of the reactants and/or the product. An abrasive can be optionally added to improve the metallation reaction. The yields of tertiary amino organometallic compounds prepared by this invention typically exceed 90%.

The present invention also provides a process for the anionic polymerization of anionically polymerizable monomers. The process of the invention includes the step of initiating polymerization of a conjugated diene hydrocarbon monomer, a mixture of conjugated diene monomers, an alkenylsubstituted aromatic compound, a mixture of alkenylaromatic compounds, or a mixture of one or more conjugated diene hydrocarbons and one or more alkenylsubstituted aromatic compounds in a hydrocarbon or mixed hydrocarbon-polar solvent medium at a temperature of 10° C. to 150° C. with one or more initiators having the formula:

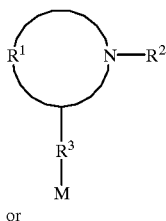

or

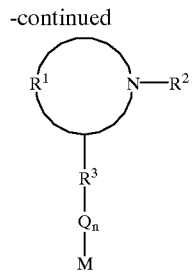

wherein:

M is an alkali metal;

$R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

$R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;

$R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—$R^3$ linkage; and n is an integer from 1 to 5, to produce an intermediate living polymer. The intermediate living polymer can then be reacted with a suitable compound known in the art for terminating, end capping or coupling living polymers. Exemplary compounds include without limitation ethylene oxide, oxygen, carbon dioxide, sulfur, omega-alkenylarylhalosilanes (as exemplified by styrenyldimethylchlorosilane), isomeric divinylbenzenes, chlorosilanes (as exemplified by silicon tetrachloride and dimethyldichlorosilane), chlorostannanes (as exemplified by tin tetrachloride and dibutyltin dichloride), alcohols (as exemplified by methanol or 2-propanol), protected electrophiles (such as 3-(t-butyldimethylsilyloxy)-1-chloropropane or 3-(1,1-dimethylethylthio)-1-chloropropane) and other materials known in the art to be useful for terminating, end capping or coupling of polymers. The resultant polymer can be linear, homotelechelic, heterotelechelic, branched, or radial polymer having one or more terminal tertiary amino functional groups with one of the selected functionalizing compounds described above. The polymer can be recovered and optionally hydrogenated.

If a mixture of monomers is employed in the polymerization, the monomers can be added together to afford random or tapered block copolymers. The monomers can also be charged to the reactor sequentially to afford block copolymers.

The novel polymers of the invention produced by this process may have linear, branched or radial architecture. Further, the polymers may be monofunctional (produced by quench of the living anion), homotelechelic (produced by coupling of the living anion with a coupling agent with two active sites, such as dichlorodimethylsilane), heterotelechelic (produced by quench of the living polymer anion with an electrophile), or polyfunctional (produced by coupling of the living anion with a coupling agent with more than two active sites, such as tin tetrachloride or diisopropenylbenzene).

Exemplary polymers are represented by FIG. 6 below:

Figure 6

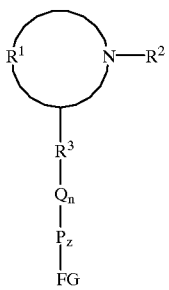

wherein:

$R^1$, $R^2$, $R^3$, Q and n are as defined above;

n is an integer from 0 to 5;

P is a saturated or unsaturated hydrocarbyl group derived by incorporation of one or more compounds selected from the group consisting of conjugated dienes, alkenylsubstituted aromatic hydrocarbons and mixtures thereof;

z is an integer from 2 to 10,000; and

FG is hydrogen or a protected or unprotected functional group.

In one aspect of the invention, the polymer includes the chain extension designated by $Q_n$ in the above formula (i.e., n is 1 to 5). In this embodiment of the invention, $Q_n$ can be an unsaturated hydrocarbyl group derived by incorporation of one or more conjugated dienes or a mixture of one or more conjugated dienes with one or more alkenylsubstituted aromatic hydrocarbons. Alternatively, $Q_n$ can be a saturated hydrocarbyl group derived by incorporation of one or more alkenylsubstituted aromatic compounds.

In another aspect of the invention, the polymers include heterotelechelic polymers. In one embodiment of this aspect of the invention, FG can be a protected or deprotected group derived by incorporation of a functionalizing agent (or electrophile) having the structure of FIG. 7:

FIG. 7

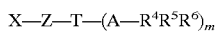

wherein:

X is halogen selected from the group consisting of chloride, bromide and iodide;

Z is a branched or straight chain hydrocarbon connecting group which contains 1–25 carbon atoms, optionally substituted with aryl or substituted aryl;

T is selected from the group consisting of oxygen, sulfur, and nitrogen and mixtures thereof, A is an element selected from Group IVa of the Periodic Table of the Elements;

$R^4$, $R^5$, and $R^6$ are each independently selected from the group consisting of hydrogen, alkyl, substituted alkyl, aryl, substituted aryl, cycloalkyl, and substituted cycloalkyl, or $R^6$ is optionally a —$(CR^7R^8)_1$— group linking two A when m is 2, wherein $R^7$ and $R^8$ are each independently selected from the group consisting of hydrogen, alkyl, substituted alkyl, aryl, substituted aryl, cycloalkyl, and substituted cycloalkyl and 1 is an integer from 1 to 7; and m is 1 when T is oxygen or sulfur, and 2 when T is nitrogen. Thus the skilled artisan will appreciate that $R^6$ as used herein includes the group

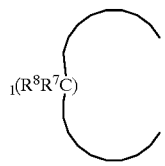

linking two A groups when m is 2.

Exemplary polymers functionalized with an electrophile of FIG. 7 can have the structure of FIG. 8 below:

Figure 8

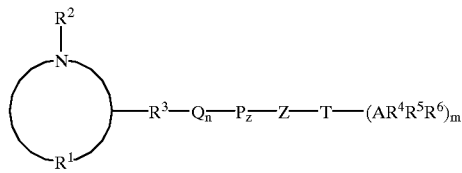

wherein $R^1$, $R^2$, $R^3$, $R^4$, $R^5$, $R^6$, Q, Z, T, A, n and m have the meanings ascribed above (i.e., FG is —Z—T—$(AR^4R^5R^6)_m$).

The functionalizing agents can be prepared as described, for example, in International Publication WO 97/16465, the entire disclosure of which is incorporated by reference. In addition, the electrophiles can be prepared as described in K. Ueda, A. Hirao, and S. Nakahama, Macromolecules, 23, 939 (1990); U.S. Pat. No. 5,496,940; U.S. Pat. No. 5,600,021; U.S. Pat. No. 5,362,699; A. Alexakis, M. Gardette, and S. Colin, Tetrahedron Letters, 29, 1988, 2951; B. Figadere, X. Franck, and A. Cave, Tetrahedron Letters, 34, 1993, 5893; J. Almena, F. Foubelo, and M. Yus, Tetrahedron, 51, 1995, 11883; D. F. Taber and Y. Wang, J. Org. Chem., 58, 1993, 6470; F. D. Toste and I. W. J. Still, Synlett, 1995, 159; and U.S. Pat. No. 5,493,044. The functionalization step can be conducted at temperatures ranging from about −30° C. to about 150° C.

If desired, the protecting group —$(AR^4R^5R^6)_m$ can be removed from the polymers. Deprotection can be performed either prior to or after the optional hydrogenation of the residual unsaturation. For example, to remove tert-alkyl-protected groups, the protected polymer can be mixed with Amberlyst® 15 ion exchange resin and heated at an elevated temperature, for example 150° C., until deprotection is complete. Tert-alkyl-protected groups can also be removed by reaction of the polymer with para-toluensulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41.

Tert-butyldimethylsilyl protecting groups can be removed by treatment of the copolymer with acid, such as hydrochloric acid, acetic acid, para-toluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

The progress of the deprotection reactions can be monitored by conventional analytical techniques, such as Thin Layer Chromatography (TLC), Nuclear Magnetic Resonance (NMR) spectroscopy, or InfraRed (IR) spectroscopy.

Deprotection of the polymer of FIG. 8 affords a functionalized polymer with the structure of FIG. 9 below:

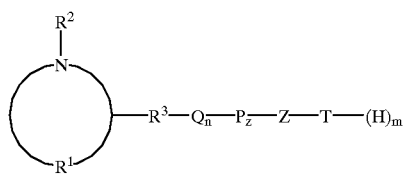

Figure 9 wherein
$R^1$, $R^2$, $R^3$, Q, P, Z, T, m, n and z have the meanings ascribed above.

The polymers of the invention can be deprotected, and the polymers can optionally be reacted with one or more comonomers to polymerize the liberated functional group T. For example, the polymers can be reacted with one or more comonomers in the presence of a strong acid catalyst to simultaneously deprotect the functional polymer and polymerize the functional end thereof to produce novel segmented block polymers. Exemplary comonomers include without limitation cyclic ethers, diamines, diisocyanates, polyisocyanates, di-, poly- and cyclic amides, di- and polycarboxylic acids, diols, polyols, anhydrides, and the like and mixtures thereof. For example, functionalized copolymers can be further reacted with monofunctional monomers, such as caprolactam, or other lactams, to form a polyamide block polymer segment, or cyclic ethers such ethylene oxide to form polyether blocks; or with difunctional monomers, such as diacids or anhydrides and diamines to form polyamide blocks, or diacids or anhydrides or lactones and diols to form polyester blocks, or diols and polyols with diisocyanates or polyisocyanates to form polyurethane blocks. Polyisocyanates or polyfunctional polyols are examples of polyfunctional monomers. The functional group may also be reacted with a suitable agent containing a reactive olefinic bond, such as a styrenic or acrylic functionality, such as methacroyl chloride, which will act to change the nature of the functionality and provide a "macromonomer" capable of polymerizing with other free radically polymerizable monomers.

Exemplary polymers include those of FIG. 10 below:

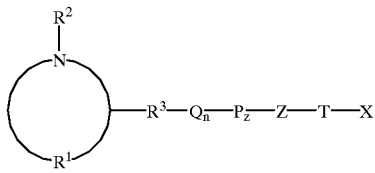

Figure 10 wherein:
$R^1$, $R^2$, $R^3$, Q, P, Z, T, n and z have the meanings ascribed above; and X is selected from the group consisting of polymer segments derived by incorporation of at least one comonomer reacted with T.

In yet another aspect of the invention, two or more living polymers can be linked using a coupling or linking agent as known in the art. In one embodiment of this aspect of the invention, the linking agent include isomeric di- and trivinylaryls as described in more detail below. The resultant polymers can have 3 to 30 arms. An exemplary polymer is illustrated by FIG. 11 below:

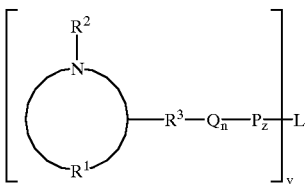

Figure 11 wherein:
$R^1$, $R^2$, $R^3$, Q, P, n, and z have the meanings ascribed above;

L is a residue of a multifunctional linking agent, such as divinylbenzene; and v is from 3 to 30. As the skilled artisan will appreciate, each $R^1$, $R^2$, $R^3$, Q, P, n, and z can differ if different living polymers are prepared and coupled.

The monomer to be polymerized is selected from the group of conjugated diene hydrocarbons, such as butadiene and isoprene, and alkenylsubstituted aromatic compounds such as styrene and alpha-methylstyrene. The monomers may be polymerized alone, or in admixture to form random copolymers, or tapered block copolymers, or by charging the monomers to the reaction mixture sequentially to form block copolymers. Examples of conjugated diene hydrocarbons include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and mixtures thereof. Examples of polymerizable alkenylsubstituted aromatic compounds which can be anionically polymerized include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methyl-1-hexene and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include without limitation 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Reference is made to U.S. Pat. No. 3,377,404 for disclosures of additional alkenylsubstituted aromatic compounds.

The inert solvent employed during the polymerizations is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents and mixtures thereof. Exemplary alkanes and cycloalkanes include those containing five to 10 carbon atoms, such as pentane, hexane, cyclohexane, methylcyclohexane, heptane, methylcycloheptane, octane, decane and the like and mixtures thereof. Exemplary aryl solvents include those containing six to ten carbon atoms, such as toluene, ethylbenzene, p-xylene, m-xylene, o-xylene, n-propylbenzene, isopropylbenzene, n-butylbenzene, and the like and mixtures thereof.

Polar solvents (modifiers) can be added to the polymerization reaction to alter 25 the microstructure of the resulting polymer, i.e., increase the proportion of 1,2 (vinyl) microstructure or to promote functionalization or randomization. Examples of polar modifiers include, but are not limited to, diethyl ether, dibutyl ether, tetrahydrofuran, 2-methyltetrahydrofuran, methyl tert-butyl ether, 1,2-dimethoxyethane (glyme), 1,2-diethoxyethane, diazabicyclo [2.2.2]octane, triethylamine, tributylamine, N-methylpiperidine, N-methylpyrrolidine, N,N,N',N'-tetramethylethylene diamine (TMEDA), and the like and mixtures thereof. The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

Examples of methods to hydrogenate the polymers of this invention are described in Falk, Journal of Polymer Science: Part A-1, vol. 9, 2617–2623 (1971), Falk, Die Angewandte Chemie, 21, 17–23 (1972), U.S. Pat. Nos. 4,970,254, 5,166, 277, 5,393,843, 5,496,898, and 5,717,035. The hydrogenation of the functionalized polymer can be conducted in situ or in a suitable solvent, such as hexane, cyclohexane or heptane, and the like. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction can be conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

Exemplary reactive agents include any of the types of compounds known in the art for terminating or end capping living polymer anions. Examples of suitable reactive compounds include, but are not limited to, alkylene oxides, such as ethyene oxide, propylene oxide, styrene oxide and oxetane; oxygen; sulfur; carbon dioxide; halogens, such as chlorine, bromine and iodine; haloalkyltrialkoxysilanes, halotrialkylsilanes, alkenylhalosilanes, and omega-alkenylarylhalosilanes such as chlorotrimethylsilane, styrenyldimethyl chlorosilane; sulfonated compounds, such as 1,3-propanesultone; amides, including cyclic amides, such as caprolactam, N-benzylidene trimethylsilylamide, dimethylformamide; silicon acetals; 1,5-diazabicyclo[3.1.0] hexane, allyl halides, such as allyl bromide, and allyl chloride; methacryloyl chloride; amines, including primary, secondary, tertiary amines, and cyclic amines, such as 3-(dimethylamino)-propyl chloride and 1-(3-chloropropyl) hexamethyleneimine; epihalohydrins, such as epichlorohydrin, epibromohydrin, and epiiodohydrin; and other materials as known in the art to be useful for terminating or end capping polymers. These and other useful functionalizing agents are described, for example, in U.S. Pat. Nos. 3,786,116 and 4,409,357. Also useful are the protected functionalized electrophiles described above. The functionalization step can be conducted at temperatures ranging from about −30° C. to about 150° C.

Examples of useful linking or coupling agents include isomeric (mixtures of ortho, meta and para) dialkenylaryls and isomeric di- and trivinylaryls, such as 1,2-divinylbenzene, 1,3-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3-diisopropenylbenzene, 1,4-diisopropenylbenzene, 1,3,5-trivinylnaphthalene, and other suitable materials known in the art to be useful for coupling polymers, as well as mixtures of coupling agents. See also U.S. Pat. Nos. 3,639, 517 and 5,489,649, and R. P. Zelinski et al in J.Polym.Sci., A3, 93, (1965) for these and additional coupling agents. Mixtures of coupling agents can also be used. Generally, the amount of coupling agent used is such that the molar ratio of protected living polymer anions to coupling agents ranges from 1:1 to 24:1. This linking process is described, for example, in U.S. Pat. No. 4,409,357 and by L. J. Fetters in Macromolecules, 9,732 (1976).

The present invention will be further illustrated by the following non-limiting examples.

EXAMPLE 1

Preparation of 2-(2-Chloroethyl)-N-Methyl-Piperidine from the Hydrochloride Salt A one liter Erlenmeyer flask equipped with a magnetic stir bar was charged with 2-(2-chloroethyl)-N-methyl-piperidine monohydrochloride (200 grams, 1.01 moles). 300 Grams (7.5 moles) of a 30% sodium hydroxide solution was added to the flask. The mixture was stirred for thirty minutes, then the mixture was transferred to a one liter separatory funnel. The phases were separated. The resulting organic layer was dried using sodium hydroxide pellets (0.9767% water) and further dried with molecular sieves (51 ppm water) and placed in the freezer. The free amine was a clear, medium yellow oil, and the yield of recovered free amine was 155.14 grams (0.961 moles), yield=95.1%.

EXAMPLE 2

Preparation of 2-(2-Lithioethyl)-N-Methyl-Piperidine

A 500 milliliter, four-necked, Morton flask was fitted with a mechanical stirrer, a rubber septum, a 125 milliliter pressure-equalizing addition funnel, and a Claisen adapter equipped with a thermocouple and a dry ice condenser with an argon inlet. This apparatus was dried in an oven overnight at 125° C., assembled hot, and allowed to cool to room temperature in a stream of argon. Lithium metal dispersion, 1.1% sodium, was washed free of mineral oil with hexane (3×100 milliliters) and pentane (1×100 milliliters). The resultant lithium metal was dried in a stream of argon, weighed (6.13 grams, 0.883 moles, 5.9 equivalents), and transferred to the reaction flask with 351.38 milliliters of cyclohexane (273.37 grams). The reaction mixture was stirred at 600 RPM's and heated to 60° C. with a heat gun. The heat source was removed. 2-(2-Chloroethyl)-N-methyl-piperidine (24.39 grams, 0.151 moles, 1.00 equivalent) was added dropwise via the addition funnel. An exotherm was detected after 16% of the halide feed had been added. A dry ice/hexane cooling bath was applied as needed to maintain the reaction temperature between 60° C.–65° C. The total halide feed time was thirty-six minutes. The reaction temperature fell off gradually to room temperature. The progress of the reaction was monitored by GC analysis of a quenched sample. The reaction mixture was stirred for nineteen hours at 600 RPM's. The reaction mixture was transferred with argon pressure to a dry, sintered glass pressure filter that contained approximately 3 grams of filter aid. The product solution was pressure filtered with 3 psi argon. The lithium chloride muds were reslurried with fresh cyclohexane (2×75 milliliters). The filtrate was a clear, light yellow solution, yield=349.71 grams.

Active C—Li=4.6 wt. %.

Yield=80 % (based on active analysis).

EXAMPLE 3

Preparation of 2-(2-Chloroethyl)-N-Methyl-Pyrrolidine from the Hydrochloride Salt A 250 milliliter Erlenmeyer flask equipped with a magnetic stir bar was charged with 2-(2-chloroethyl)-N-methyl-pyrrolidine monohydrochloride (24.46 grams, 0.1329 moles). 100 Grams (2.5 moles) of a 30% sodium hydroxide solution was added to the flask. The mixture was stirred for thirty minutes, then the mixture was transferred to a 500 milliliter separatory funnel. The phases were separated. The resulting organic layer was dried with molecular sieves (66.5 ppm water) and placed in the freezer. The free amine was a clear, bright yellow oil, and the yield of recovered free amine was 18.43 grams (0.125 moles), 94.0%.

EXAMPLE 4

Preparation of 2-(2-Lithioethyl)-N-Methyl-Pyrrolidine

A 500 milliliter, four-necked, Morton flask was fitted with a mechanical stirrer, a rubber septum, a 125 milliliter pressure-equalizing addition funnel, and a Claisen adapter equipped with a thermocouple and a dry ice condenser with an argon inlet. This apparatus was dried in an oven overnight at 125° C., assembled hot, and allowed to cool to room temperature in a stream of argon. Lithium metal dispersion, 1.1% sodium, was washed free of mineral oil with hexane (3×100 milliliters) and pentane (1×100 milliliters). The resultant lithium metal was dried in a stream of argon, weighed (5.05 grams, 0.727 moles, 10.32 equivalents), and transferred to the reaction flask with 245.10 milliliters of cyclohexane (190.69 grams). The reaction mixture was stirred at 600 RPM's and heated to 60° C. with a heat gun. The heat source was removed. 2-(2-Chloroethyl)-N-methyl-pyrrolidine (10.40 grams, 0.0705 moles, 1.00 equivalent) was added dropwise via the addition funnel. An exotherm was detected after 23.1% of the halide feed had been added. A dry ice/hexane cooling bath was applied as needed to maintain the reaction temperature between 60° C.–65° C. The total halide feed time was seventeen minutes. The reaction temperature fell off gradually to room temperature. The progress of the reaction was monitored by GC analysis of a quenched sample. The reaction mixture was stirred for five hours at 600 RPM's. The reaction mixture was transferred with argon pressure to a dry sintered glass pressure filter that contained approximately 3 grams of filter aid. The product solution was pressure filtered with 3 psi argon. The lithium chloride muds were reslurried with fresh cyclohexane (1×30 milliliters). The filtrate was a slightly hazy, light yellow solution, yield=179.22 grams.

Active C—Li=3.60 wt. %.

Yield=76.93% (based on active analysis).

EXAMPLE 5

Preparation of 3-Chloromethyl-N-Methyl-Piperidine from the Hydrochloride Salt

A 250 milliliter Erlenmeyer flask fitted with a magnetic stir bar was charged with 3-chloromethyl-N-methyl-piperidine monohydrochloride (20.06 grams, 0.1090 moles). 70.61 Grams (1.77 moles) of a 30% sodium hydroxide solution was added to the flask. The mixture was stirred for thirty minutes, then the mixture was transferred to a 500 milliliter separatory funnel. The phases were separated. The resulting organic layer was dried with molecular sieves and stored in the freezer. The free amine was a clear, amber oil, and the yield of recovered free amine was 14.57 grams (0.0988 moles), 90.6%.

EXAMPLE 6

Preparation of 3-Lithiomethyl-N-Methyl-Piperidine

A 500 milliliter, four-necked, Morton flask was fitted with a mechanical stirrer, a rubber septum, a 125 milliliter pressure-equalizing addition funnel, and a Claisen adapter equipped with a thermocouple and a dry ice condenser with an argon inlet. This apparatus was dried in an oven overnight at 125° C., assembled hot, and allowed to cool to room temperature in a stream of argon. Lithium metal dispersion, 1.1% sodium, was washed free of mineral oil with hexane (3×100 milliliters) and pentane (1×100 milliliters). The resultant lithium metal was dried in a stream of argon, weighed (4.52 grams, 0.651 moles, 9.25 equivalents), and transferred to the reaction flask with 150.31 milliliters of cyclohexane (116.94 grams). The reaction mixture was stirred at 600 RPM's and heated to 60° C. with a heat gun. The heat source was removed. 3-Chloromethyl-N-methyl-piperidine (10.38 grams, 0.0704 moles, 1.00 equivalent) was added dropwise via the addition funnel. An exotherm was detected after 8.30% of the halide feed had been added. A dry ice/hexane cooling bath was applied as needed to maintain the reaction temperature between 60° C.–65° C. The total halide feed time was twelve minutes. The reaction temperature fell off gradually to room temperature. The progress of the reaction was monitored by GC analysis of a quenched sample. The reaction mixture was stirred for two hours at 600 RPM's. The reaction mixture was transferred with argon pressure to a dry sintered glass pressure filter that contained approximately 3 grams of filter aid. The product solution was pressure filtered with 3 psi argon. The lithium chloride muds were reslurried with fresh cyclohexane (2×15 milliliters). The filtrate was a clear, yellow-tinted solution, yield=119.97 grams.

Active C—Li=5.8 wt. %.

Yield=79.32% (based on active analysis).

EXAMPLE 7

Preparation of 2-(2-Lithioethyl)-N-Methyl-Piperidine Chain Extended With Isoprene A 500 milliliter, four-necked, Morton flask was fitted with a mechanical stirrer, a rubber septum, a 125 milliliter pressure-equalizing addition funnel, and a Claisen adapter equipped with a thermocouple and a dry ice condenser with an argon inlet. This apparatus was dried in an oven overnight at 125° C., assembled hot, and allowed to cool to room temperature in a stream of argon. Lithium metal dispersion, 1.1% sodium, was washed free of mineral oil with hexane (3×100 milliliters) and pentane (1×100 milliliters). The resultant lithium metal was dried in a stream of argon, weighed (8.03 grams, 1.16 moles, 3.26 equivalents), and transferred to the reaction flask with 201.92 milliliters of cyclohexane (157.09 grams). The reaction mixture was stirred at 600 RPM's and heated to 60° C. with a heat gun. The heat source was removed. 2-(2-Chloroethyl)-N-methyl-piperidine (57.33 grams, 0.355 moles, 1.00 equivalent) was added dropwise via the addition funnel. An exotherm was detected after 2.60% of the halide feed had been added. A dry ice/hexane cooling bath was applied as needed to maintain the reaction temperature between 60° C.–65° C. The total halide feed time was sixty-four minutes. The reaction temperature fell off gradually to room temperature. The progress of the reaction was monitored by GC analysis of a quenched sample. The reaction stirred at room temperature for two hours. The reaction mixture was reheated to 60° C. with a heat gun then the heat was removed. Isoprene (48.96 grams, 0.719 moles, 2.02 equivalents) was added dropwise via the addition funnel. An exotherm was detected after 36% of the feed had been added. A dry ice/hexane cooling bath was applied as needed to maintain the reaction temperature between 60° C.–65° C. The total isoprene feed time was thirty-seven minutes. The temperature fell off rapidly to room temperature. The reaction mixture was stirred for sixty-three hours at 600 RPM's. The reaction mixture was transferred with argon pressure to a dry sintered glass pressure filter that contained approximately 3 grams of filter aid. The product solution was pressure filtered with 3 psi argon. The lithium chloride muds were reslurried with fresh cyclohexane (2×75 milliliters). The filtrate was a clear, amber solution, yield=305.12 grams.

Active C—Li=29.9 wt. %.

Yield=90.8% (based on active analysis).

EXAMPLE 8

Preparation of Tertiary Amino Functionalized Polyisoprene

A 500 ml. glass reactor was equipped with two break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. 2-(2-Lithioethyl)-N-methyl-piperidine, 8.5 wt. % in cyclohexane, 0.395 grams contained (2.97 mmoles) was added to the reactor with a syringe via the inlet tube. Cyclohexane, 300 ml., was then vacuum distilled directly into the reactor. The flask was then removed from the vacuum line by a flame seal. Purified isoprene (12.3 grams), was added by breaking the seal of the ampoule containing isoprene. The reaction proceeded for 24 hours at room temperature, and then terminated with a large amount of degassed methanol. added from the second break-seal ampoule. The functionalized polymer was recovered by precipitation two times into methanol, and vacuum dried for twenty four hours. The resultant functionalized polymer was characterized by SEC, and had the following properties:

$M_n$=4.23×10³ g/mole $M_w/M_n$=1.10

Yield=93.0%

By TLC analysis using toluene as an eluent, only a small amount of unfunctionalized polymer was detected, and the polymer was separated and isolated in 93% yield by weight after precipitation and drying. The polymer was further characterized by $^1$H NMR which spectrum indicated a 1,4 microstructure of 87% and exhibited a singlet peak at δ=2.20 ppm assigned to the N-methyl group.

EXAMPLE 9

Preparation of Homotelechelic Tertiary Amino Functionalized Polyisoprene

A 500 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. 2-(2-Lithioethyl)-N-methyl-piperidine, 7.8 wt. % in cyclohexane, 0.718 grams contained (5.4 mmoles) was added to the reactor with a syringe via the inlet tube. Cyclohexane, 300 ml., was then vacuum distilled directly into the reactor. The flask was then removed from the vacuum line by a flame seal. Purified isoprene (16.3 grams), was added by breaking the seal of the ampoule containing isoprene. The reaction proceeded for twelve hours at room temperature. A 2 ml. aliquot was withdrawn through the sample port, and quenched with methanol. The resultant base polymer was analyzed by SEC. From a second ampoule, 2.8 mmoles of dimethyldichlorosilane, 1% solution in cyclohexane, was added from a second break-seal ampoule, and the mixture was stirred for eight hours at room temperature. The reaction mixture was then quenched with degassed methanol added from the last break-seal ampoule. The polymer was recovered by precipitation two times in methanol, and vacuum dried.

The base polymer before coupling was analyzed by SEC, and had the following properties:

$M_n$ (obs.)=3150

$M_w/M_n$=1.09.

The resultant telechelic polymer was characterized by SEC, and showed no evidence of base polymer, and had the following properties:

$M_n$ (obs.)=6550

$M_w/M_n$=1.08.

EXAMPLE 10

Preparation of Heterotelechelic Tertiary Amino Functionalized Polybutadiene

A 500 ml. glass reactor is equipped with three break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 2-(2-Lithioethyl)-N-methyl-piperidine chain extended with two equivalents of isoprene, 28.0 wt. % in cyclohexane, 1.160 grams contained (4.31 mmoles) is added to the reactor with a syringe via the inlet tube. Cyclohexane, 300 ml., is then vacuum distilled directly into the reactor. The flask is then removed from the vacuum line by a flame seal. The reactor flask is then heated to 50° C., and 15.2 grams of purified butadiene is added by breaking the seal of the ampoule containing butadiene. The reaction mixture is held 50–55° C. at for 5 hours. A 10 ml. aliquot is withdrawn through the sample port, and quenched with methanol. The resultant base polymer was analyzed by SEC. To the remaining living polymer of α-N-methylpiperidino-functionalized poly(butadienyl) lithium, 6.45 mmoles (50% molar excess) of 1-(3-chloropropyl)-hexamethyleneimine is then added from the second break-seal ampoule. The reaction mixture is stirred for several hours and the progress of the reaction is monitored by TLC. Degassed methanol is then added from the third break-seal ampoule. The α,ω-tertiary amino functionalized heterotelechelic polymer is recovered by precipitation two times into methanol, and is vacuum dried for twenty four hours.

The resultant heterotelechelic functionalized polymer is characterized by SEC, and has the following properties:

$M_n$=3.7×10³ g/mole $M_w/M_n$=1.05

Yield=91.0%

By TLC analysis using toluene as an eluent, a small amount of unfunctionalized polymer is detected, and the polymer is separated and isolated in 91 % yield by weight after precipitation and drying. The polymer is further characterized by ¹H NMR which spectrum indicates a 1,4 microstructure of 85% and exhibits a peak at δ=2.20 ppm assigned to the N-methyl group.

EXAMPLE 11

Preparation of Tertiary Amino Functionalized Polybutadiene Radial Polymer

A 500 ml glass reactor is equipped with three break-seal reagent ampoules, a sampling port attached with a Teflon stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-Lithiomethyl-N-methyl-piperidine, 8.0 wt. % in cyclohexane, 0.090 grams contained (0.755 mmoles) is added to the reactor with a syringe via the inlet tube. The inlet tube is then flame sealed, and the reactor is re-evacuated. Dry cyclohexane solvent, 200 ml., is then distilled directly into the reactor. The flask is then removed from the vacuum line by a flame seal. The reactor is then heated to 50° C., and 20.43 grams (30 ml.) of butadiene is added from a break seal ampoule. The reaction mixture is held at 50–55° C. for five hours. A 2 ml. aliquot is withdrawn through the sample port, and quenched with methanol. The resultant base polymer is analyzed by SEC. The temperature is increased to 60° C., then divinylbenzene 1.53×10⁻³ moles (0.39 ml., 3.3 equivalents) is added from the second break seal ampoule. The reaction mixture is stirred at 60° C. for nine hours, then quenched with degassed methanol (1.5 ml.) added from the last break seal ampoule. The polymer is recovered by precipitation two times into methanol, and vacuum dried.

The resultant functionalized base polymer is characterized by SEC, and has the following properties:

$M_n$=29,000 g/mole $M_w/M_n$=1.04

The resultant functionalized multi-arm star polymer is fully characterized by ¹H NMR and SEC, and has the following properties:

Mn=210,000 g/mole (based on linear polybutadiene standards).

$M_w/M_n$=1.09

Unlinked=14%

The ¹H NMR spectrum exhibits peaks at 2.20 ppm for the N-methyl group. The ¹H NMR spectrum indicates a 1,4:1,2 microstructure ratio of 94:6.

EXAMPLE 12

Preparation of Tertiary Amino Functionalized Random SBR

A 500 ml. glass reactor was equipped with four break-seal reagent ampoules, a sampling port attached with a Teflon® stopcock, an inlet tube fitted with a septum cap, and a magnetic stir bar. Triethylamine was stirred over calcium hydride for 6 hours before distilling into a marked ampoule. A solution of potassium tert-amyloxide in toluene was used without further purification. The reactor was flame sealed to a high vacuum line, and evacuated at 120° C. for 8 hours. The flask was refilled with dry argon, and allowed to cool to room temperature. 2-(2-Lithioethyl)-N-methyl-piperidine, 8.5 wt. % in cyclohexane, 0.053 grams contained (0.40 mmoles) was added to the reactor with a syringe via the inlet tube under argon atmosphere. Toluene solvent was added to the reactor and purified under vacuum and cyclohexane, 350 ml, was then vacuum distilled directly into the reactor to make a dilute solution of toluene in cyclohexane. The flask was then removed from the vacuum line by a flame seal. Purified butadiene (15.0 grams), purified styrene(5.0 grams), triethylamine (1.12 ml, 8 mmols), and potassium amyloxide (0.032 mmols) were added by breaking the seals of the ampoules. The reactor was heated to 50° C. and stirred for 3 hours at that temperature, before being terminated with a large amount of degassed methanol. The functionalized polymer was recovered by precipitation of the resulting solution into a large amount of methanol, giving 19.5 grams of sample after vacuum drying overnight. 2,6-Di-tert-butyl-4-methylphenol (BHT, 0.01%) was added to the polymer solution as an antioxidant just before the precipitation.

The resultant functionalized polymer was characterized by SEC, which was calibrated by universal calibration using polystyrene standards, and had the following properties:

$M_n$=5.25×10⁴ g/mole $M_w/M_n$=1.10

Yield=95.0%

The portion of blocky styrene and 1,2 vinyl microstructure of butadiene segment were calculated as 13.4% and 18.0%, respectively by ¹H NMR analysis.

The foregoing examples are illustrative of the present invention and are not to be construed as limiting thereof. The invention is defined by the following claims, with equivalents of the claims to be included therein.

That which is claimed is:

1. A hydrocarbon solution comprising at least one tertiary amino anionic polymerization initiator of the formula:

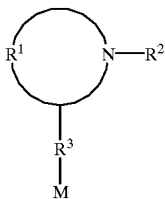

wherein:

M is an alkali metal;

R$^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

R$^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl; and R$^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms.

2. A process for the preparation of hydrocarbon solutions of monofunctional tertiary amine initiators comprising a compound of the structure:

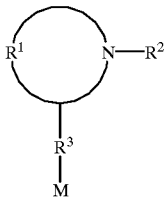

wherein:

M is an alkali metal;

R$^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

R$^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl; and R$^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms, the process comprising reacting at least one tertiary amino halide with an alkali metal having a particle size between 10 and 300 microns in size at a temperature ranging from about 35 to about 130° C. in an alkane, cycloalkane or aromatic solvent or a mixture thereof to form said alkali metal-containing monofunctional tertiary amine initiator.

3. A hydrocarbon solution comprising at least one tertiary amino anionic polymerization initiator of the formula:

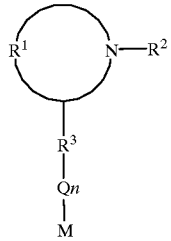

wherein:

M is an alkali metal;

R$^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

R$^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl; and R$^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—R³ linkage; and n is an integer from 1 to 5.

4. A process for the preparation of hydrocarbon solutions of monofunctional tertiary amine initiators comprising a compound of the structure:

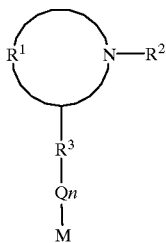

wherein:

M is an alkali metal;

R¹ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

R² is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;

R³ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—R³ linkage; and n is an integer from 1 to 5, the process comprising:

reacting at least one tertiary amino halide with an alkali metal having a particle size between 10 and 300 microns in size at a temperature ranging from about 3 to about 130° C. in an alkene, cycloalkane or aromatic solvent to form an alkali metal-containing monofunctional tertiary amine product of the formula

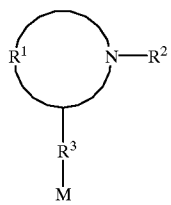

wherein

M, R¹, R² and R³ are the same as defined above; and adding one or more conjugated diene hydrocarbons, one or more alkenylsubstituted aromatic compounds, or a mixture of one or more dienes with one or more alkenylsubstituted aromatic compounds to form an extended hydrocarbon chain $Q_n$ between M and R³, wherein Q and n are as defined above.

5. A process for the anionic polymerization of anionically polymerizable monomers comprising the steps of:

initiating polymerization of a conjugated diene hydrocarbon monomer, a mixture of conjugated diene monomers, an alkenylsubstituted aromatic compound, a mixture of alkenylsubstituted aromatic compounds, or a mixture of one or more conjugated diene hydrocarbons and one or more alkenylsubstituted aromatic compounds in a hydrocarbon or mixed hydrocarbon-polar solvent medium at a temperature of 10° C. to 150° C. with at least one initiator having the formula:

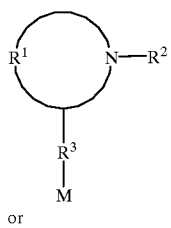

or

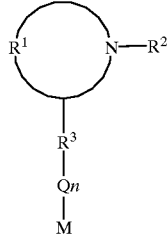

wherein:

M is an alkali metal;

R¹ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

R² is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;

$R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M□$R^3$ linkage; and n is an integer from 1 to 5, to produce an intermediate living polymer; and reacting the intermediate living polymer with a terminating, functionalizing, or coupling agent.

6. The process of claim 5, wherein said living polymer is reacted with a functionalizing agent to form a polymer of the structure:

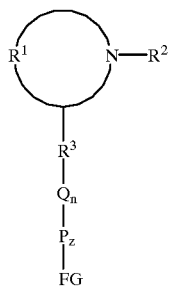

wherein:

$R^1$, $R^2$, $R^3$, Q, and n are as defined above;

P is a saturated or unsaturated hydrocarbyl group derived by incorporation of one or more compounds selected from the group consisting of conjugated dienes, alkenylsubstituted aromatic hydrocarbons and mixtures thereof;

z is an integer from 2 to 10,000; and

FG is a protected or unprotected functional group.

7. The process of claim 6, wherein said functionalizing agent is selected from the group consisting of alkylene oxides, oxygen, sulfur, carbon dioxide, halogens, haloalkyltrialkoxysilanes, halotrialkylsilanes, alkenylhalosilanes, omegaalkenylarylhalosilanes, sulfonated compounds, silicon acetals, 1,5-diazabicyclo[3.1.0] hexane, allyl halides, methacryloyl chloride, amines, epihalohydrins, 1-(3chloropropyl)-hexamethyleneimine, and mixtures thereof.

8. The process of claim 6, wherein said functionalizing agent comprises a compound of the formula

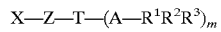

wherein:

X is halogen selected from the group consisting of chloride, bromide and iodide;

Z is a branched or straight chain hydrocarbon connecting group which contains 1–25 carbon atoms, optionally substituted with aryl or substituted aryl;

T is selected from the group consisting of oxygen, sulfur, and nitrogen and mixtures thereof;

A is an element selected from Group IVa of the Periodic Table of the Elements;

$R^4$, $R^5$, and $R^6$ are each independently selected from the group consisting of hydrogen, alkyl, substituted alkyl, aryl, substituted aryl, cycloalkyl, and substituted cycloalkyl, or $R^6$ is optionally a —$(CR^7R^8)_l$— group linking two A when m is 2, wherein $R^7$ and $R^8$ are each independently selected from the group consisting of hydrogen, alkyl, substituted alkyl, aryl, substituted aryl, cycloalkyl, and substituted cycloalkyl and l is an integer from 1 to 7; and m is 1 when T is oxygen or sulfur, and 2 when T is nitrogen, to form a polymer of the formula

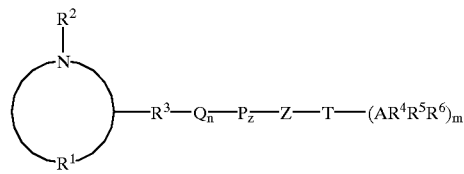

wherein $R^1$, $R^2$, $R^3$, $R^4$, $R^5$, $R^6$, Q, Z, T, A, n and m have the meanings ascribed above.

9. The process of claim 8, further comprising the steps of:

removing said protecting group —$(A—R^4R^5R^6)_m$ to liberate the functional group T; and optionally reacting said liberated functional group T with one or more comonomers to produce a polymer segment.

10. The process of claim 9, wherein said removing step and said reacting step occur simultaneously.

11. The process of claim 8, further comprising:

removing said protecting group $(A—R^4R^5R^6)_m$ to liberate the functional group T; and optionally reacting said liberated functional group T under conditions sufficient to modify the functionality of T to incorporate a reactive olefinic bond.

12. The process of claim 5, wherein:

said coupling agent is selected from the group consisting of isomeric dialkenylaryls, isomeric di- and trivinylaryls, and mixtures thereof; and said polymer has the formula

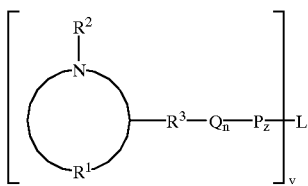

wherein:
$R^1$, $R^2$, $R^3$, Q, P, n, and z have the meanings ascribed above;
L is a residue of a multifunctional linking agent; and
v is from 3 to 30.

13. The process claim 5, wherein said initiator has the formula

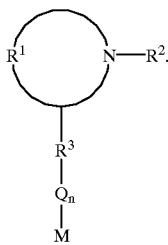

14. The process of claim 13, wherein Q is an unsaturated hydrocarbyl group derived by incorporation of one or more conjugated dienes or a mixture of one or more conjugated dienes with one or more alkenylsubstituted aromatic hydrocarbons.

15. The process of claim 13, wherein Q is a saturated hydrocarbyl group derived by incorporation of one or more alkenylsubstituted aromatic hydrocarbons.

16. The process of claim 5, further comprising:
recovering said polymer; and
optionally hydrogenating the recovered polymer.

17. A polymer having the formula

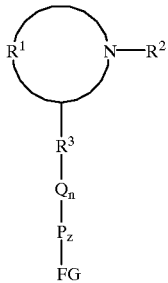

wherein:
$R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;
$R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;

$R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—$R^3$ linkage;

n is an integer from 0 to 5;

P is a saturated or unsaturated hydrocarbyl group derived by incorporation of one or more compounds selected from the group consisting of conjugated dienes, alkenylsubstituted aromatic hydrocarbons and mixtures thereof;

z is an integer from 2 to 10,000;

FG is hydrogen or a protected or unprotected functional group.

18. The polymer of claim 17, wherein n is an integer from 1 to 5.

19. The polymer of claim 18, wherein Q is an unsaturated hydrocarbyl group derived by incorporation of one or more conjugated dienes or a mixture of one or more conjugated dienes with one or more alkenylsubstituted aromatic hydrocarbons.

20. The polymer of claim 18, wherein Q is a saturated hydrocarbyl group derived by incorporation of one or more alkenylsubstituted aromatic compounds.

21. The polymer of claim 17, wherein FG is —Z—T—(A—$R^1R^2R^3$)$_m$, wherein:

Z is a branched or straight chain hydrocarbon connecting group which contains 1–25 carbon atoms, optionally substituted with aryl or substituted aryl;

T is selected from the group consisting of oxygen, sulfur, and nitrogen and mixtures thereof;

A is an element selected from Group IVa of the Periodic Table of the Elements;

$R^4$, $R^5$, and $R^6$ are each independently selected from the group consisting of hydrogen, alkyl, substituted alkyl, aryl, substituted aryl, cycloalkyl, and substituted cycloalkyl, or $R^6$ is optionally a —(C$R^7R^8$)$_l$— group linking two A when m is 2, wherein $R^7$ and $R^8$ are each independently selected from the group consisting of hydrogen, alkyl, substituted alkyl, aryl, substituted aryl, cycloalkyl, and substituted cycloalkyl and l is an integer from 1 to 7; and m is 1 when T is oxygen or sulfur, and 2 when T is nitrogen.

22. The polymer of claim 17, wherein FG is —Z—T—(H)$_m$, wherein:
  Z is a branched or straight chain hydrocarbon connecting group which contains 1–25 carbon atoms, optionally substituted with aryl or substituted aryl;
  T is selected from the group consisting of oxygen, sulfur, and nitrogen and mixtures thereof; and
  m is 1 when T is oxygen or sulfur, and 2 when T is nitrogen.
23. The polymer of claim 17, wherein FG is —Z—T—X, wherein:
  Z is a branched or straight chain hydrocarbon connecting group which contains 1–25 carbon atoms, optionally substituted with aryl or substituted aryl;
  T is selected from the group consisting of oxygen, sulfur, and nitrogen and mixtures thereof; and
  X is a polymer segments derived by incorporation of at least one comonomer reacted with T.
24. A polymer of the formula

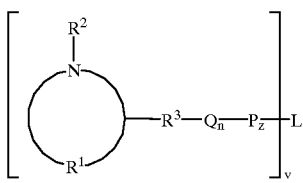

wherein:
  $R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;
  $R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;
  $R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;
  Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—$R^3$ linkage;
  n is an integer from 0 to 5;
  P is a saturated or unsaturated hydrocarbyl group derived by incorporation of one or more compounds selected from the group consisting of conjugated dienes, alkenylsubstituted aromatic hydrocarbons and mixtures thereof;
  z is an integer from 2 to 10,000;
  L is a residue of a multifunctional linking agent; and
  v is from 3 to 30.
25. The polymer of claim 24, wherein L is a residue of one or more coupling agents selected from the group consisting of isomeric dialkenylaryls, isomeric di- and trivinyl aryls, and mixtures thereof.
26. A functionalized polymer which contains at least one tertiary amine functionality pendant to the polymer backbone.
27. The polymer of claim 26, wherein said polymer is a homotelechelic functionalized polymer.
28. The polymer of claim 26, wherein said polymer is a heterotelechelic functionalized polymer.
29. The polymer of claim 26, wherein said polymer is a functionalized radial polymer.
30. The polymer of claim 26, wherein said polymer is hydrogenated.
31. A tertiary amino anionic polymerization initiator of the formula:

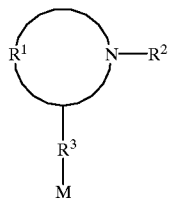

wherein:
  M is an alkali metal;
  $R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;
  $R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl; and
  $R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms.

32. A tertiary amino anionic polymerization initiator of the formula:

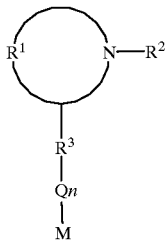

wherein:
M is an alkali metal;
$R^1$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;
$R^2$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl; and $R^3$ is a hydrocarbon connecting group or tether selected from the group consisting of saturated and unsaturated, linear and branched C1–C25 alkyl; saturated and unsaturated C3–C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—$R^3$ linkage; and n is an integer from 1 to 5.

* * * * *

UNITED STATES PATENT AND TRADEMARK OFFICE
CERTIFICATE OF CORRECTION

PATENT NO. : 6,184,338
DATED : February 6, 2001
INVENTOR(S) : Schwindeman et al.

It is certified that error appears in the above-identified patent and that said Letters Patent is hereby corrected as shown below:

<u>Column 24,</u>
Line 1, "alkene" should read -- alkane --.

<u>Column 27,</u>
Line 16, "3to 30" should read -- 3 to 30 --.

Signed and Sealed this

Fourteenth Day of August, 2001

Attest:

NICHOLAS P. GODICI
*Attesting Officer*  *Acting Director of the United States Patent and Trademark Office*